June 11, 1968     R. Q. ARMINGTON     3,387,724
DETECTING DEVICE FOR AN AUTOMATIC WAREHOUSING SYSTEM
Filed May 26, 1966     4 Sheets-Sheet 3

INVENTOR
RAYMOND Q ARMINGTON
BY
Baldwin, Doran & Egan
ATTORNEYS

June 11, 1968 R. Q. ARMINGTON 3,387,724
DETECTING DEVICE FOR AN AUTOMATIC WAREHOUSING SYSTEM
Filed May 26, 1966 4 Sheets-Sheet 4

INVENTOR
RAYMOND Q. ARMINGTON
BY
Baldwin, Doran & Egan
ATTORNEYS

United States Patent Office 3,387,724
Patented June 11, 1968

3,387,724
DETECTING DEVICE FOR AN AUTOMATIC
WAREHOUSING SYSTEM
Raymond Q. Armington, Willoughby, Ohio, assignor to
The Triax Company, Cleveland, Ohio, a corporation
of Ohio
Filed May 26, 1966, Ser. No. 553,229
20 Claims. (Cl. 214—16.4)

This invention relates in general to automatic warehousing systems, and more particularly to a device for detecting improperly positioned loads or other obstructions, in the system.

It is well known in the automatic warehousing art to provide a storage frame having a plurality of storage openings accessible at a generally vertical load receiving face of the storage frame, and having a powered load carrier for delivering loads to or retrieving loads from such storage openings. The storage frame may be provided in parallel sections with each section having storage openings facing an aisle disposed between such sections. The load carrier may comprise a horizontally movable conveyor frame which travels along the aisle and provides vertical track means for an elevator capable of delivering loads to different levels in the storage frame. The elevator in turn may carry a laterally extensible extractor or transfer means, for inserting loads into the storage openings and retrieving loads therefrom.

It is also known in the art to provide detecting mechanism in conjunction with a load carrier for detecting skewed or otherwise disarranged loads, and stopping the motion of the load carrier when such detecting means senses an improperly positioned load, to thereby prevent collision damage between the load carrier and the improperly positioned load, and/or between the load and the storage frame. Examples of various kinds of such detecting mechanisms for use in automatic warehousing systems are disclosed in the copending U.S. patent application Ser. No. 427,824, filed Jan. 25, 1965, in the name of Anthony R. Chasar, and entitled Load Sensing Apparatus.

The present invention provides a detecting mechanism for use in an automatic warehousing system, and wherein such detecting mechanism is of the type embodying generally flexible or yieldable sensing means adapted for disposal in the running clearance between the storage frame and the load carrier. If engagement occurs between the sensing means and an improperly positioned load or other obstruction during movement of the load carrier, the sensing means is moved or flexed causing actuation of control means such as a limit switch, which is operative to cut off the power to the load carrier, thus stopping the latter. In accordance with the present invention means is provided to partially rigidify such yieldable sensing means, so that such sensing means will not deflect around an improperly positioned load or other obstruction which may be just slightly in the path of the load carrier, thus insuring that engagement between the sensing means and the improperly positioned load or obstruction will positively stop movement of the load carrier, thus insuring that no damage will occur due to such improperly positioned load.

Accordingly, an object of the invention is to provide a novel detecting means for use with an automatic warehousing system.

Another object of the invention is to provide a novel detecting means for use with an automatic warehousing system which includes multi-level storage means and a powered load carrier movable in a travel zone alongside of the storage means, for inserting a load into or removing a load from any selected level of the storage means, and wherein such detecting means is operable to detect improperly positioned loads in the storage frame and to stop further movement of the load carrier, to thus prevent collision damage between such improperly positioned load and the load carrier and/or the storage frame.

A still further object of the invention is to provide a load detecting means of the above discussed type wherein such means includes an elongated yieldable sensing element adapted for positioning in the clearance space between the load carrier and the storage frame, and with such yieldable sensing element having generally rigid means coacting therewith for a portion of the length of the sensing element for rigidifying such portion of said yieldable sensing element.

A still further object of the invention is to provide a mechanism of the above discussed type wherein said yieldable sensing element comprises a cable adapted to be positioned to define an opening at least partially enclosing the path of movement of a laterally movable extractor on the load carrier, and wherein the rigidifying means comprises spaced tubular-like elements coacting with said cable in mounted relation, with such tubular elements receiving said cable therethrough.

A further object of the invention is to provide a detecting device of the above discussed type wherein said yieldable sensing element is coupled to a rotatable pulley member, with the pulley member having means thereon coacting with switch means to normally maintain the switch means in condition for energization of the load carrier, and with said pulley being adapted to be rotated upon engagement of the yieldable sensing element and associated rigidifying means with an improperly positioned load in the running clearance, to cause tripping of the switch means, thus causing deenergization of said load carrier to stop the latter.

Other objects and advantages of the invention will be apparent from the following description taken in conjunction with the accompanying drawings wherein.

Figure 1:
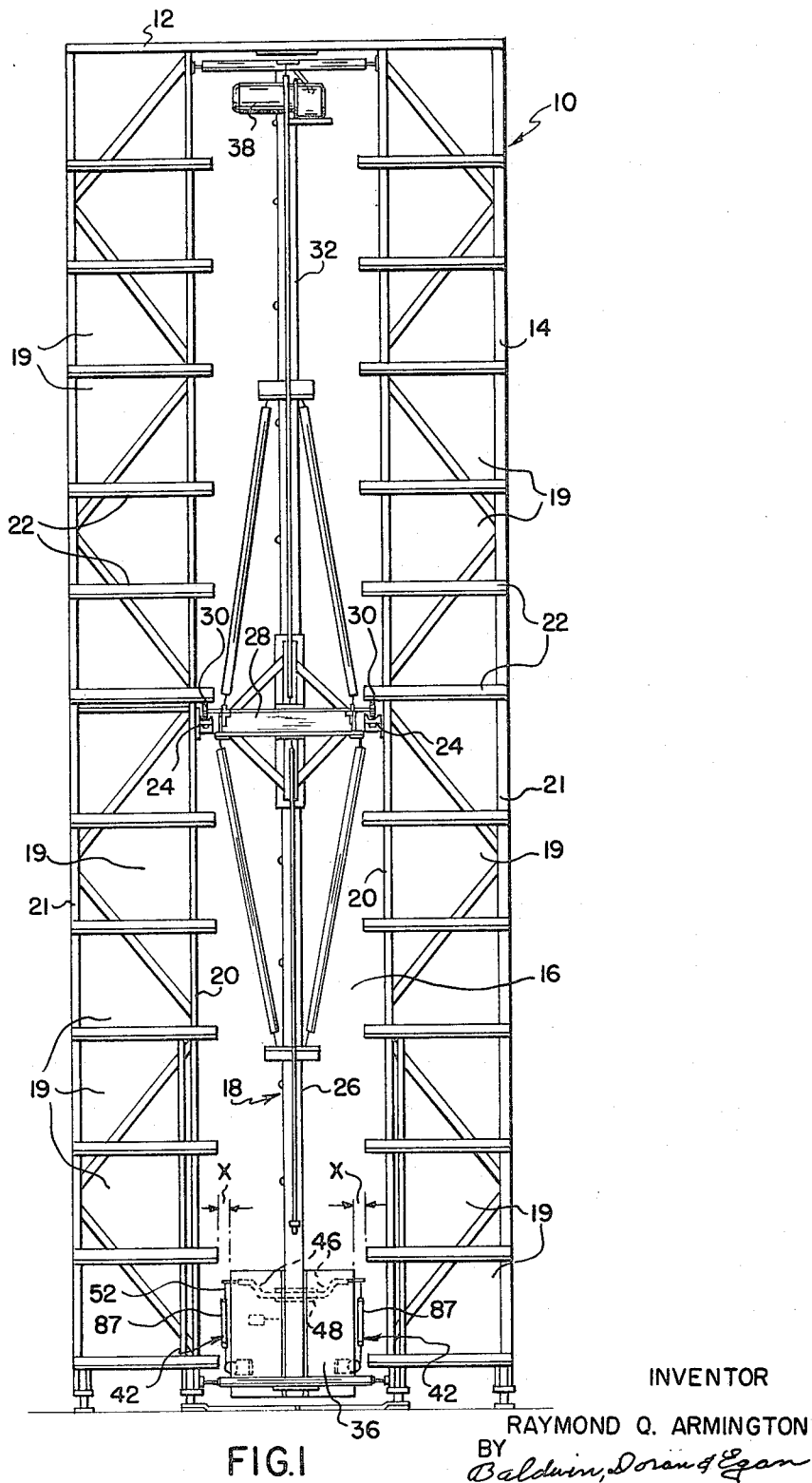
FIGURE 1 is an end view of an automatic warehousing system including a storage frame comprising a plurality of tiered bins and showing a load carrier associated therewith, with the load carrier having mounted thereon a load detecting device for sensing improperly positioned loads in accordance with the invention.

Referring now again to the drawings, the automatic warehousing system, in the embodiment illustrated, comprises a storage frame 10 having generally parallel storage frame sections 12 and 14, defining between them a travel zone or aisle 16, so as to permit a motorized load carrier, indicated generally at 18, to be moved along the aisle or travel zone, and to insert and/or withdraw a load or article from the storage bins 19 in the storage sections 12 and 14.

As shown, each storage section may be constructed of a plurality of vertically extending posts 20, 21 spaced apart by a plurality of generally horizontally extending load supporting members 22 which at their aisle or inner ends extend inwardly toward the aisle, and provide a plurality of the storage bins, the latter having open load receiving ends defining a generally vertical plane. The instant arrangement of warehousing system may be generally similar to that disclosed in the copending United States patent application Ser. No. 484,845, filed Sept. 3, 1965, in the name of Anthony R. Chasar, and entitled Automatic Warehousing System, and reference may be had thereto for a more detailed description of such storage arrangement.

The aisle sides of the storage frame sections 12, 14 may be provided with a pair of generally horizontally extending rails 24 (FIGURE 1) defining tracks providing for supporting the load carrier 18 as it is moved therealong within the travel zone 16, with there being provided a relatively small running clearance X (FIGURE 1) between the sides of the load carrier and the confronting sides of the storage sections during movement of the load carrier in the travel zone.

Figure 2:
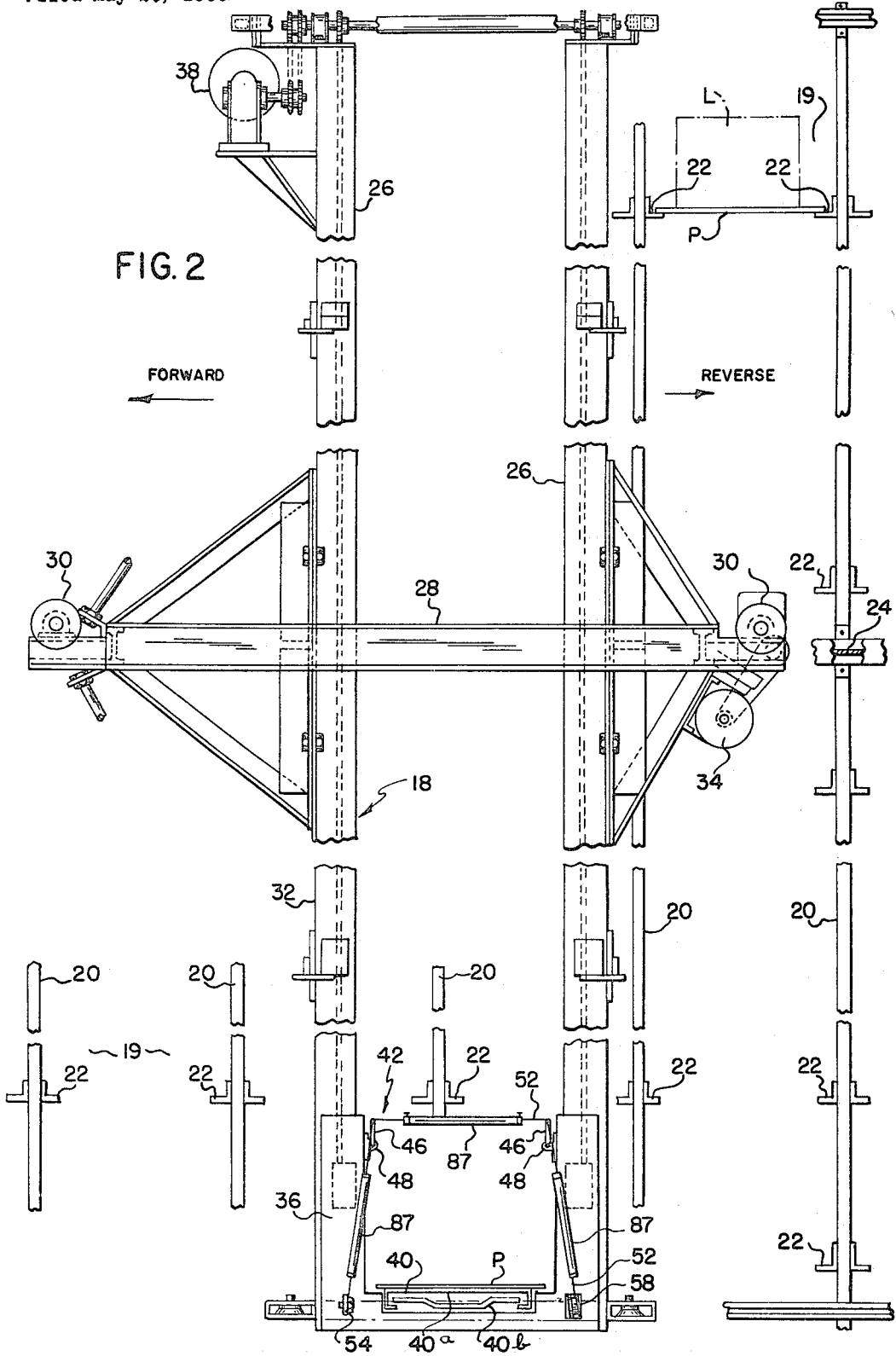
FIGURE 2 is a fragmentary broken side elevational view of the load carrier and associated detecting device of FIGURE 1.

The load carrier 18 may comprise an upright mast structure formed with a pair of generally vertically extending track members 26 (FIGURE 2) with the mast structure being secured to an intermediate carriage frame 28. Carriage frame 28 is adapted to bridge the distance across the aisle and may have wheels 30 at the sides thereof, which are disposed in rolling engagement with the tracks 24, thus supporting the load carrier 18 on the tracks for horizontal movement. Such horizontally movable structure of the load carrier will be hereinafter referred to as conveyor mechanism or frame 32. Suitable power means, such as a reversible electric motor 34, may be provided for actuating the conveyor frame 32 in its horizontal movement.

Rails 24 preferably extend outwardly of the aisle at the front end of the aisle, to enable the load carrier to be located in front of the storage sections at a pickup and discharge station, from which position the load carrier is adapted to commence its movement into the aisle to deposit or pickup loads in the storage frame sections. Reference may be had to the aforementioned United States patent application Ser. No. 484,845, for a detailed disclosure of such a pickup and discharge station.

Load carrier 18 may include a vertical movable elevator 36 adapted for movement along the vertical tracks 26 of the mast structure to the full height of the storage frame sections. Elevator 36 is adapted to move through an opening in the carriage frame 28 as the elevator moves to the upper portion of the storage frame above the carriage frame 28, and thus is unimpeded in its vertical movement. Suitable power means, such as a reversible electric motor 38 (FIGURE 2) operably coupled to the elevator, may be provided for actuating the elevator in its vertical movement.

Mounted on the elevator 36 may be a load supporting platform or extractor mechanism 40 which provides an extensible table formed in the embodiment illustrated of upper and lower sections 40a, 40b supported one above the other, with such table being extendable in either of the opposed directions transverse to the direction of movement of the load carrier in its travel zone, so as to locate the upper table section within either of the storage sections 12 or 14, effective to place the extensible table in position to deposit or remove a load from a selected one of the storage bins. Suitable power means such as a reversible electric motor 41 (FIGURE 3) may be operably coupled to the extractor for actuating the latter.

In normal operation of the load carrier, the latter is moved to the selected opening in the storage bin by the horizontally movable conveyor 32 and the elevator 36 is moved progressively or simultaneously vertically to the selected load level. The extractor 40 is then moved laterally into the storage bin to either pick-up a load at the selected load level in the storage frame, or to deposit a load from the extractor onto the load receiving means 22 in the storage bin. In the case of a load being moved into a storage bin, the upper table section 40a of the extractor is disposed slightly above the load supporting members 22 mounted on the sides of the bin. When the load L is completely within the confines of the bin, the extractor 40 is lowered slightly to deposit the load pallet P onto the load support members, and thus permit retraction of the upper and lower table sections of the extractor back to their stacked position with respect to the elevator. Conversely, when it is desired to remove a load or article from the storage bin, the extractor is located such that the upper table section 40a is extended into the bin slightly below the load supporting pallet, and thereafter the extractor may be raised so as to lift the load pallet and associated load off its supporting members 22, and then the extractor is retracted back to its stacked condition. After the depositing or picking-up a load, the extractor returns laterally back into the elevator and substantially centers itself therein.

Now in accordance with the instant invention, detecting means or device 42 is provided, which is operative to detect an improperly positioned load or other obstruction extending into the running clearance X between the load carrier and the storage frame, and to stop movement of the load carrier before damage to the load and/or to the storage frame and/or to the load carrier can occur.

Referring now in particular to FIGURES 3 to 7, such detecting device may be supported by laterally directed and longitudinally spaced supports 46 each of which may be secured to the respective upright side of the elevator as by means of brackets 48. Each support 46 may be provided with a laterally and upwardly angled section 46a (FIGURE 3) and a straight generally horizontal distal end section 46b. The support may be made from tubular material, such as steel tube, and the distal end section 46b may carry a laterally projecting member or rod 50 telescopically mounted in the associated end section 46b against the resistance of a spring member 51, which spring member is adapted to bias the rod 50 outwardly to the full line position illustrated in FIGURES 3 and 4. Upon application of axial end pressure to the rod, the rod 50 is adapted to move inwardly thereby compressing the associated spring.

The sensing means for the load detecting device may comprise an elongated generally flexible yieldable element 52, such as a steel cable, disposed in the running clearance X, and which may be connected at one end thereof, as at 54, to the vertically movable elevator. Such cable then extends somewhat diagonally upwardly and over the upwardly disposed telescoping rod 50 of the associated support 46. The cable may pass in generally loose but guided relation through a groove 56 in the outer end of rod 50, and then may extend generally horizontally across the elevator to the other telescoping rod 50 on the same side of the load carrier and pass through a groove 56 therein. The cable then extends downwardly, generally diagonally, to be coupled to a rotatable pulley 58 mounted on a laterally extending bracket 60, preferably detachably secured to the elevator below the top surface of the extractor 40. Pulley 58 upon rotation thereof, is adapted to actuate a control means 62, which may include a switch assembly 64, as will be hereinafter described, for controlling the application of power to the drive motors which drive the load carrier. As may be best seen in FIGURES 3 and 4, brackets 60 may be mounted in a recess 65 in the side of the elevator for proper positioning of the detecting device in the running clearance X.

The movement of the conveyor frame 32 of the load carrier and the movement of the elevator and extractor thereof, are all preferably automatically actuated in a predetermined series of simultaneous or sequential movements, to store or retrieve a load, and as by means of automatic control means of the type disclosed in the copending United States application of Sanford Saul, filed Dec. 14, 1964 under Ser. No. 418,048, and entitled Electrical Control Circuit for an Automatic Warehousing System. The switch assembly 64 may be connected into such a control circuit in conventional manner, well known to those skilled in the control art, to break the circuit in a main power lead or isolate a master control relay to cut off power to the power means for the load carrier and stop all further movement of the latter, upon actuating engagement of the detecting means with an improperly positioned load or other obstruction extending into the running clearance. As disclosed in the above patent application, the motors powering the load carrier have electroresponsive braking means associated therewith to prevent overrunning of the motors upon the deenergization thereof.

Figure 4:
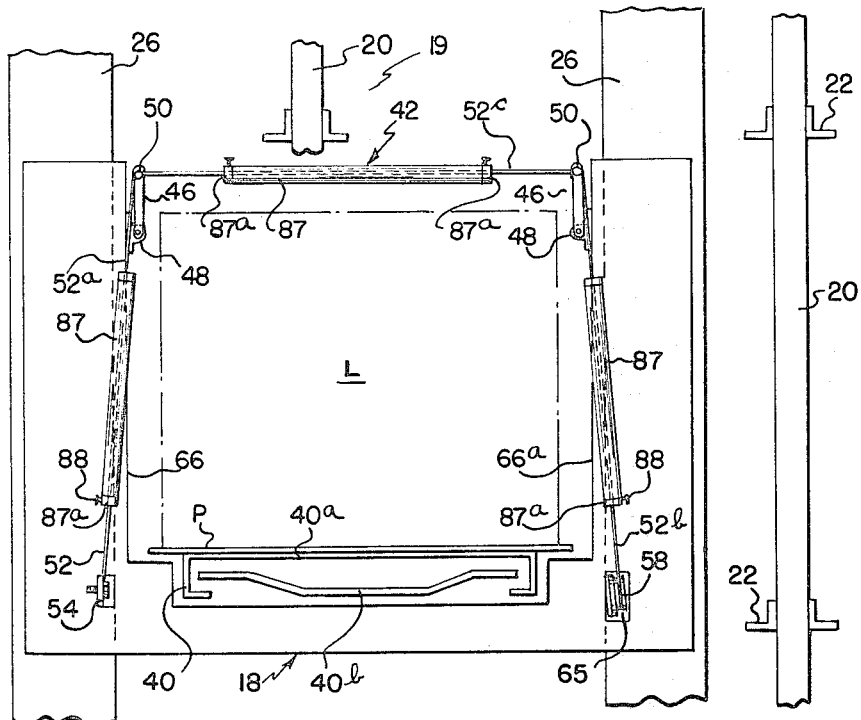
FIGURE 4 is an enlarged fragmentary side elevational view of the load carrier and detecting device of FIGURE 3.
Figure 7:
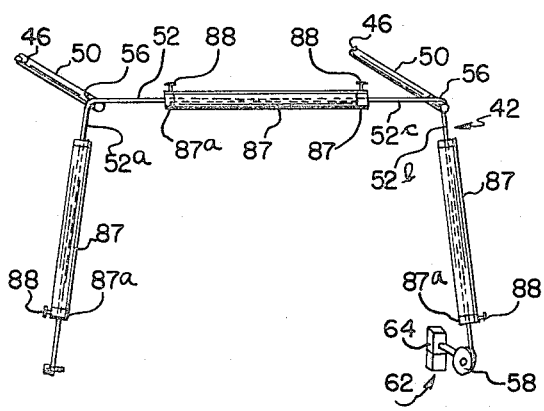
FIGURE 7 is a diagrammatic, generally perspective view of the load detecting device illustrating the stringing of the yieldable sensing means.

As can be best seen in FIGURE 4, generally vertical portion 52a of flexible element 52 is disposed in the running clearance, preferably forwardly for a substantial portion thereof, of the plane of inner side surface 66 of the elevator and forwardly of the plane of the corresponding side surface of the load L, and extends generally below the level of the top surface of the extractor 40. Generally vertical portion 52b of the flexible element is disposed in the running clearance generally rearwardly, for a substantial portion thereof, of the plane of the inner side surface 66a of the elevator and rearwardly of the plane of the corresponding side surface of the load L, while generally horizontal portion 52c of the flexible element is disposed generally adjacent the plane of the top extremity of the elevator. Such flexible element defines a passageway through which the extractor and load L mounted thereon, is adapted to pass upon lateral actuation of the extractor to deposit a load into or remove a load from the storage frame.

The pulley 58 may be rotatably mounted upon a shouldered bolt 67 having a smooth shank portion for receiving the pulley wheel, with the bolt being suitably fastened to the bracket 60. The outer surface of the pulley wheel may carry a circular cam 68, the axis of which is radially displaced from the axis of the pulley wheel. The cam 68 may be secured to the pulley wheel by any suitable means, such as a bolt 70, and is adapted to travel in an arc around the axis of the pulley wheel whenever the pulley wheel is rotated.

In its normal position, the cam is disposed substantially exactly opposite to the roller 72 of the spring loaded plunger type switch actuator 74 of the conventional switch assembly 64, and when in such position, contacts the roller 72 and cams the actuator 74 inwardly. When the actuator 74 is disposed inwardly in the position illustrated in FIGURE 5, the contacts of the limit switch 64 are held in a position to permit energization of the power means (e.g. 34, 38, 41) and thus permit the load carrier to operate normally, or in other words to move in the travel zone between the storage sections. Rotation of the cam around the axis of the pulley upon rotation of the pulley, and away from the roller 72 permits the actuator 74 to move outwardly due to the action of the spring coacting with the actuator, whereby the limit switch contacts move to cut-off position, thereby stopping all movement of the load carrier.

A detent mechanism 76 may be mounted in the pulley wheel so as to releasably hold the pulley wheel in the position illustrated. Such detent mechanism may comprise a threaded cartridge, threaded into an aperture extending through the pulley wheel, and carrying a spring biased detent 78. The detent is directed toward the flange 80 of the bracket, and such flange may be provided with a recess 82 adapted to receive the distal end of the detent 78. The recess is so positioned that the detent is seated therein when the pulley wheel and the cam are in the position shown, and such detent and recess create sufficient resistance to the turning of the pulley wheel so that any tendency of the cam 68 to roll away from the actuating roller 72 of the limit switch is restricted. In this position the flexible cable is pulled relatively taut with the pulley end of the cable being looped about the pulley and then projecting through an aperture in one flange of the pulley wheel and being secured to the outside of the pulley wheel, as by means of the screw 86.

In accordance with the present invention the flexible element 52 is provided with sensing means rigidifying the respective portions 52a, 52b and 52c thereof, and such means in the embodiment illustrated, comprises an elongated tubular member 87 through which extends the associated portion of the flexible means, with there being an apertured collar 87a secured to at least one end of the associated tubular member and having means coacting therewith, such as set screw 88, for attaching the tubular member to the flexible element. It will be seen that such tubular members 87 do not extend for the full length of the respective portion but terminate substantially before the respective ends thereof.

Members 87 may be conveniently provided from some lightweight material, such as aluminum tubing. Thus while such tubular members rigidify the respective flexible cable portion, they still permit a substantial amount of flexibility of the respective cable section but prevent the flexibility being such that the cable section might deform around an object extending only partially into the running clearance without tripping the associated switch 64, thus insuring that the switch will be tripped if the detecting means engages an obstruction, to stop all further movement of the load carrier.

Figure 3:
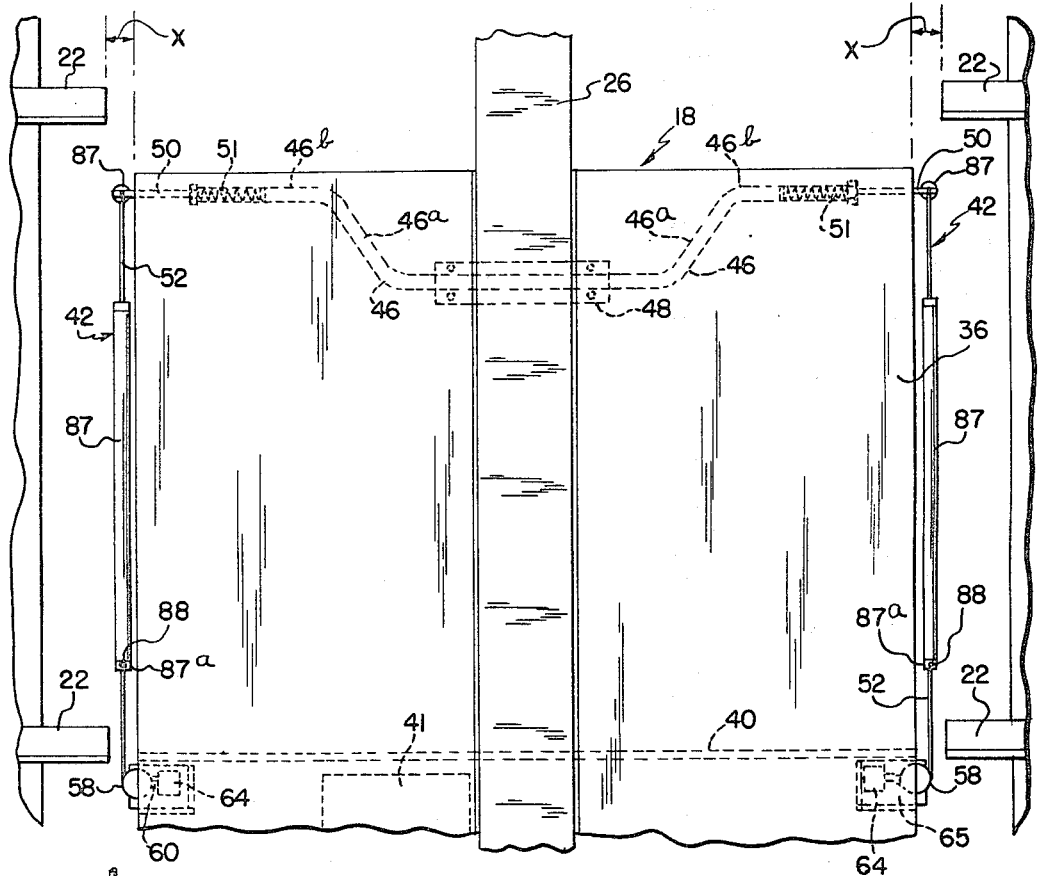
FIGURE 3 is an enlarged fragmentary end elevational view of the load carrier and associated detecting device.
Figure 5:
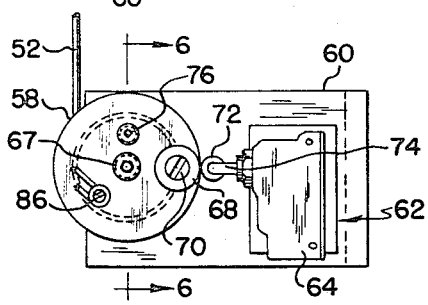
FIGURE 5 is a side elevational view of the pulley member and switch operably coupled to the yieldable sensing member and which switch is adapted for controlling the energization and deenergization of the load carrier.
Figure 6:
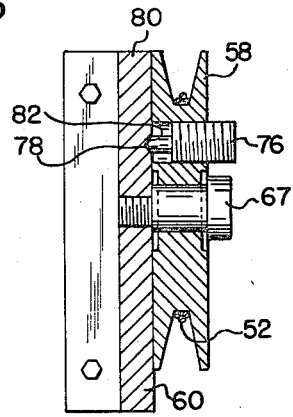
FIGURE 6 is an enlarged sectional view taken generally along the plane of line 6—6 of FIGURE 5 looking in the direction of the arrows.

As can be best seen in FIGURE 3, a detecting device is preferably associated with each side of the load carrier for sensing obstructions in the running clearance between the load carrier and the storage frame sections.

While the detecting device has been illustrated as comprising a continuous cable or flexible element, it will be understood that such device could comprise generally rigid elements, such as the tubular elements 87 disposed in spaced relationship, and connected at their ends by flexible sections, or sections of flexible cable, in which event the cable would not pass through the tubular elements but would merely connect the generally rigid elements to provide a detecting device having substantially the same result.

It will be seen that if an improperly positioned load is extending outwardly from the storage frame into the running clearance on either side of the load carrier, as the load carrier moves in the travel zone between the storage frame sections, and if such improperly positioned load engages the generally taut detecting device on the associated side of the load carrier, such engagement will cause the cable to be deflected. Due to the rigidifying means associated with the cable, the cable will not deflect around such obstruction even if it only projects slightly into the running clearance. Accordingly, rotation of the pulley wheel against the resistance of the spring loaded detent will occur permitting the actuator of the limit switch to move outwardly. Outward movement of the actuator will actuate the switch contacts to cut off the power to the load carrier motors and stop any further movement of the carrier. Thus damage to the load and/or to the load carrier and/or to the storage frame is prevented. Such a detecting means also provides an arrangement whereby an operator can pull on the device and stop movement of the carrier.

Running clearance X as used in the aforegoing specification and hereinafter set forth claims will be understood to mean the clearance provided in the warehousing system between the plane of the aisle side of the storage frame and the confronting side of the load carrier-elevator-extractor mechanism 18. The running clearance does not include the sensing means 52, 87 and/or their supporting and guiding structure 50, 58, 60, which are deformable and/or expendable if struck by an object.

The terms and expressions which have been used are used as terms of description and not of limitation and there is no intention in the use of such terms and expressions of excluding any equivalents of any of the features shown or described or portions thereof and it is recognized that various modifications are possible within the scope of the invention claimed.

I claim:

1. In a warehousing system for handling loads into and from a plurality of storage means having open load receiving ends defining a generally vertical plane and with there being a travel zone alongside of said plane, a load carrier movable in said travel zone for delivering a load to or returning a load from said storage means, with their being a running clearance between said load carrier and said storage means, and power means for actuating said load carrier, the combination therewith of detecting means mounted on said load carrier for detecting obstacles projecting into the running clearance, said detecting means comprising generally flexible sensing means disposed in said running clearance, control means coacting between said detecting means and said power means for deenergizing said power means upon actuating engagement between said detecting means and an obstacle projecting into said running clearance, and other sensing means coacting with said flexible sensing means for partially rigidifying said detecting means.

2. A warehousing system in accordance with claim 1 wherein said other sensing means extends parallel to said flexible sensing means and is secured to the latter.

3. A warehousing system in accordance with claim 1 wherein said other sensing means includes an elongated generally rigid member, and means coupling said rigid member to said flexible sensing means.

4. A warehousing system in accordance with claim 3 wherein said rigid member is comprised of a lightweight tubing through which extends said flexible sensing means, said coupling means including an apertured collar secured to said tubing and fastener means extending through said collar into holding engagement with said flexible sensing means.

5. A warehousing system in accordance with claim 1 wherein said flexible sensing means comprises a non-resilient movable cable-like member, one end of which is coupled to a rotatable member mounted on said load carrier, an operating cam on said rotatable member, said control means including a switch having a spring loaded actuator normally engaged with said cam for maintaining said switch in condition for energization of said power means, means releasably holding said rotatable member in position to cause engagement of said actuator by said cam, said rotatable member being adapted to be rotated upon engagement of the detecting means by an improperly positioned load extending into said running clearance, to cause movement of said cam away from said actuator whereby said switch is tripped to cause deenergization of said power means and thus stopping of said load carrier.

6. The warehousing system in accordance with claim 1 wherein said detecting means is supported on said load carrier by generally laterally projecting arms mounting said flexible sensing means and said other sensing means in said running clearance.

7. A warehousing system in accordance with claim 1 wherein said load carrier comprises conveyor means movable generally horizontally in said travel zone alongside of said plane, elevator means movable generally vertically on said conveyor means alongside said plane, and load supporting extractor means on said elevator means and being movable generally transversely of said travel zone across said running clearance for selectively depositing a load into or removing a load from the respective storage means at each load handling position, and said detecting means being mounted on said elevator so as to be oriented in said running clearance in non-interfering relation with said extractor means.

8. A warehousing system in accordance with claim 7 wherein said flexible sensing means comprises a non-resilient movable cable-like member disposed in generally taut condition and one end of which is anchored to said elevator and the other end of which is coupled to a rotatable member mounted on said elevator, means releasably resisting rotation of said rotatable member and said control means including a switch coacting with said rotatable member for deenergizing said power means upon engagement of said detecting means with an obstruction extending into said running clearance.

9. A warehousing system in accordance with claim 7 wherein said detecting means is of generally inverted U-shape configuration in elevation and partially encompasses the path of movement of said extractor means, and support means projecting laterally from said elevator means and mounting said detecting means in said running clearance.

10. A warehousing system in accordance with claim 9 wherein said support means is adapted for movement in directions transverse of said running clearance for movably mounting said detecting means in said running clearance.

11. A warehousing system in accordance with claim 7 including spaced support means mounted on said elevator means adjacent the upper portion thereof and extending laterally of said elevator means into said running clearance, said flexible sensing means comprising a cable-like member anchored at one end thereof to said elevator means generally below the top load supporting surface of said extractor means and extending upwardly into supported coaction with certain of the support means, then generally horizontally into supported coaction with other of said support means, and then extending downwardly to be coupled to a yieldable member mounted on said elevator means generally below said top surface of said extractor means, said flexible sensing means being in generally taut condition and defining a generally inverted U-shaped configuration in elevation which partially encompasses the path of movement of said extractor means, and said other sensing means comprising a plurality of generally rigid members spaced along said cable-like member and being secured thereto, said rigid-like members partially rigidifying sections of said cable-like member, and control means including a switching device coacting with said yieldable member for deenergizing said power means upon engagement of said detecting means with an obstruction extending into said running clearance.

12. A warehousing system in accordance with claim 11 wherein said elevator means includes generally vertically extending inner side surfaces and said inverted U-shape configuration of flexible sensing means includes generally vertically extending sections which are disposed at least partially forwardly and rearwardly of the planes of said inner side surfaces of said elevator means and which extend diagonally inwardly in an upward direction with respect to said elevator means to be mounted in slidable relation on said support means.

13. A warehousing system in accordance with claim 1 including laterally spaced storage bays each comprising a plurality of said storage means and with said spaced storage bays defining said travel zone therebetween in which said load carrier is adapted to move, and a detecting means mounted on each side of said load carrier in confronting relation to the storage means in the respective storage bay.

14. A warehousing system in accordance with claim 1 wherein said flexible sensing means comprises a cable member disposed in generally inverted U-shaped configuration in elevation and including generally vertical cable sections and a generally horizontal cable section, said other sensing means comprising a plurality of tubular-like members, each of which is coupled to a respective one of said cable sections, and with said tubular-like members terminating inwardly of the ends of the respective cable section, and means releasably coupling the tubular-like members to the respective cable section, said tubular-like members rigidifying the respective cable section and preventing the detecting means from deflecting around an obstacle extending just slightly into the running clearance.

15. A load detecting device for use with a warehousing system of the type comprising a storage frame and a load carrier movable in a travel zone alongside said storage frame for delivering a load to or returning a load from said storage frame, with there being a running clearance between said load carrier and said storage frame, and with there being power means for actuating said load carrier, said detecting device comprising flexible sensing means adapted for mounting on said load carrier in said running clearance for detecting improperly positioned loads projecting into said running clearance between said storage frame and said load carrier, other sensing means coacting with said flexible sensing means for partially rigidifying said detecting device, and control means operatively coupled to said sensing means and adapted for coupling to said power means for deenergizing the latter when said detecting device engages a load extending improperly into said running clearance.

16. A load detecting device in accordance with claim 15 wherein said flexible sensing means comprises an elongated cable-like member and said other sensing means includes a generally rigid member secured to said cable-like member for rigidifying the cable-like member for a predetermined portion of said cable-like member.

17. A load detecting device in accordance with claim 16 wherein said rigid member comprises a section of tubing through which said cable-like member extends, and means securing said tubing to said cable-like member.

18. A load detecting device in accordance with claim 16 wherein said rigid member comprises a section of lightweight tubing, a collar secured to at least one end of said tubing, and a fastener device extending through said collar into holding coacting with said cable-like member.

19. A load detecting device in accordance with claim 15 wherein said control means comprises a switch adapted for coupling to said power means, means coupling said switch to said sensing means for actuation of said switch upon predetermined movement of said sensing means, and means for mounting said switch on said load carrier.

20. A load detecting device in accordance with claim 19 wherein said means coupling said switch to said sensing means comprises a rotatable pulley member to which said sensing means is secured, means for mounting said pulley member on said load carrier, means releasably resisting rotation of said pulley member with respect to the last mentioned mounting means, cam means on said pulley member for normally maintaining said switch in closed position, and said switch including means for opening said switch upon predetermined rotation of said pulley member with respect to said switch, said rotation of said pulley member being occasioned by actuating engagement of said detecting device with an improperly positioned load extending into said running clearance.

References Cited

UNITED STATES PATENTS 3,323,661   6/1967   Chasar ............ 214—16.4

GERALD M. FORLENZA, *Primary Examiner.*

R. B. JOHNSON, *Assistant Examiner.*